March 12, 1935. J. A. ROBERTS 1,994,421
SIPHON AND THEFT PROOF GAS TANK COVER
Filed March 24, 1934
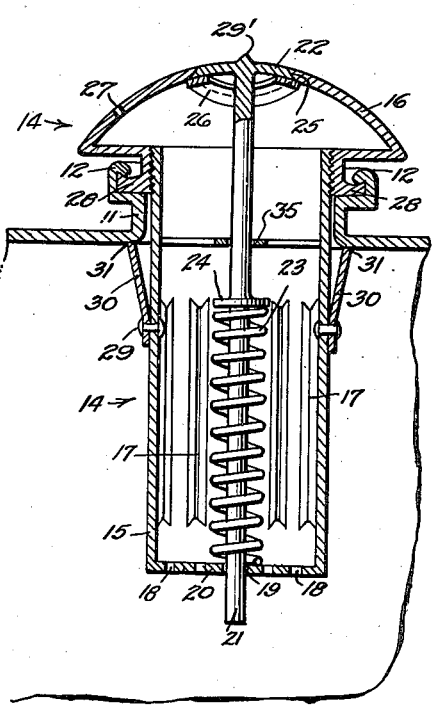
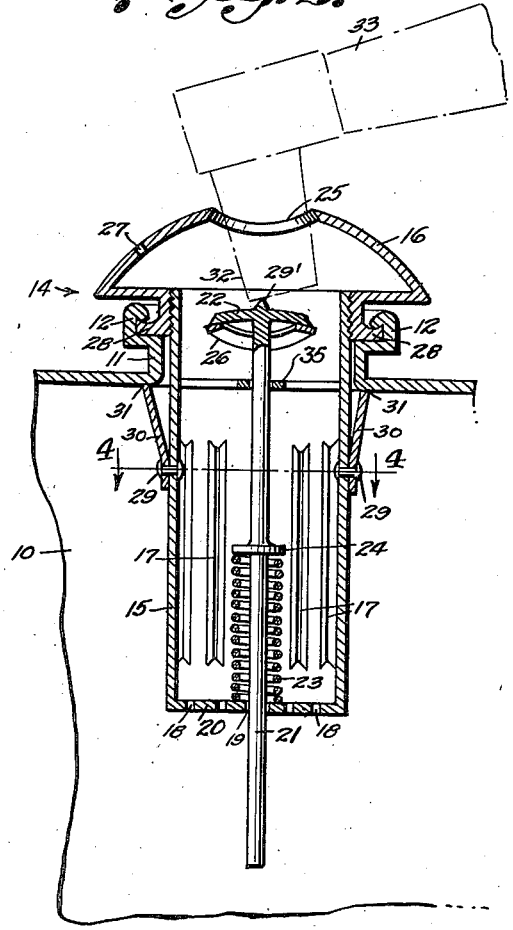
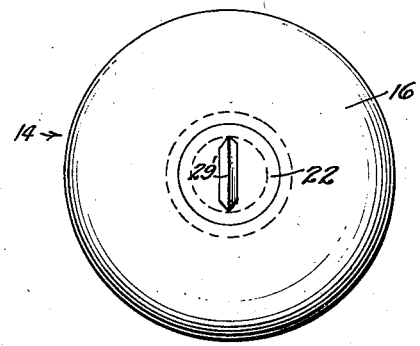
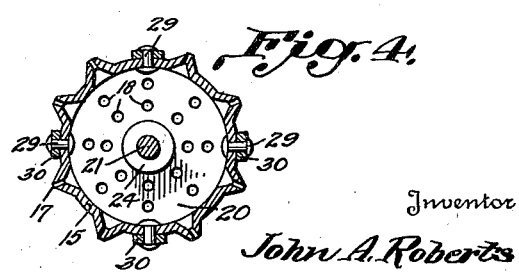
Inventor
John A. Roberts
By Miller & Miller
Attorneys Patented Mar. 12, 1935 1,994,421

UNITED STATES PATENT OFFICE 1,994,421

SIPHON AND THEFT PROOF GAS TANK COVER

John A. Roberts, New York, N. Y.

Application March 24, 1934, Serial No. 717,248

3 Claims. (Cl. 220—86)

This invention relates to a siphon and theftproof gas tank cover and has for an object to provide an improved cover or cap especially intended for use on the gasoline tank of automobiles or other vehicles.

A further object of this invention is to provide a gasoline tank cover or cap which may be substituted for the conventional gasoline tank cap or cover already in position on the tank, and which, when once in position is permanently locked in position, preventing removal thereof and preventing theft of gasoline from the tank with this improved cover in position.

A further object of this invention is to provide a siphon and theftproof gas tank cover which may be as quickly and easily installed in place of the conventional cover as it takes to remove or replace the gasoline tank cover, and which when once installed automatically locks itself in position against removal.

Still a further object of this invention is to provide a siphon and theftproof gas tank cover which cooperates with the gasoline hose nozzle to admit the nozzle of the hose therein and allow gasoline to be placed into the tank therethrough and which automatically closes itself as the nozzle is removed.

Still a further object of this invention is to provide a spring closed valve on this improved gas tank cover, which valve is depressed by the nozzle of the gasoline hose, and in which it is impossible for the opening in the hose to be blocked by the outer contour of the depressible valve.

With the foregoing and other objects in view, as will hereinafter become apparent, this invention comprises the constructions, combinations and arrangements of parts hereinafter set forth, disclosed and shown on the accompanying drawing. In this drawing, Figure 1 is a vertical sectional view of the invention, Figure 2 is a sectional view of the same showing the nozzle inserted in the valve cap, Figure 3 is a top plan view of the gas cap, and Figure 4 is a sectional view taken on the line 4—4 of Figure 2.

There is shown at 10 a fragmentary representation of the gasoline tank of an automobile or other vehicle having the usual opening 11 provided with the usual interrupted screw 12 projecting therefrom to receive the conventional cover or cap. The siphon and theftproof cover 14 constituting this invention comprises a short cylindrical member 15 to the open end of which is secured a dome cap 16. The cylindrical member 15 is provided with a plurality of longitudinal V-shaped slits 17 spaced around the side walls thereof and a plurality of very small openings 18 in the bottom 20 thereof.

Extending through a spider 35 and a central aperture 19 in the bottom 20 of the cylindrical member 15 is the stem 21 of a depressible valve 22. A spring 23 secured between the bottom 20 of cylindrical member 15 and a suitably formed shoulder 24 on the stem 21 serves to urge the valve 22 into closing position within the port 25 in the dome cap 16. A suitable washer 26 secured to the bottom of the valve 22 cooperates with the inside of the dome cap 16 and serves to limit the movement of the valve 22 so as to hold it in a closing position, as shown in Figure 1, and prevent the entrance of dirt and dust therethrough. A breather hole 27 may be suitably located in the dome cap 16 to allow entrance of air into the tank 10 as the gasoline is being consumed in the usual manner.

In order to hold this improved cover 14 in locked position in the tank 10, the dome cap 16 is provided with dogs 28 cooperating with the interrupted screw 12 in the usual manner, allowing this improved cover 14 to be inserted through the opening 11 and secured by the dogs 28 in the same manner that the conventional cap is secured thereto. Securely riveted as at 29 to the sides of the cylindrical member 15 are a plurality of locked spring arms 30 having their ends 31 normally bent away from the sides of the cylindrical member 15. When this cover 14 is being inserted through the tank opening 11 the spring arms 30 will compress against the sides of the cylindrical member 15, allowing it to be easily placed in position in the same manner as the conventional cover is placed in position.

Once this cover 14 has been fully inserted, the ends 31 of the spring arms 30 will spring away from the sides of the cylindrical member 15 and lock under the inside of the gas tank 10, thereby preventing theft or removal of the cover. The valve 22 is provided with an upwardly projecting V-shaped ridge or spacer 29' so that when the nozzle 32 of the gasoline hose 33 is placed thereagainst it will be impossible for the opening in the nozzle to be accidentally closed by otherwise having the top of the valve 22 fitting snugly across the opening in the nozzle.

In operation, in order to insert gasoline into the tank 10 the top of the dome cap 16 and valve 22 will be first wiped off to remove any dust that may have accumulated thereon, and then the nozzle 32 of the gasoline hose 33 is merely pressed thereagainst, depressing the valve 22 and permitting the nozzle 32 to enter in opening 25 and allowing gasoline to enter into the cylindrical member 15 whence it escapes through the V-slots 17 and apertures 18 into the tank 10. The spring 23 is a fairly stiff spring so as to securely hold the valve 22 in closed position and further so as to require a rigid member of at least the weight and mass of the conventional gas hose nozzle 32 to depress the same and open the port 25. As a result of this and of the limited space between the edges of the valve 22 or washer 26 and the inside of the cylindrical member 15, it is impossible to insert a rubber hose into the tank 10 for the purpose of fraudulently siphoning the gas therefrom. Further, the member 15 is of such a short length that it will not normally reach through the gasoline level in the tank 10 unless the tank 10 be so full as to be overflowing. Even if a rigid conduit should be inserted through the port 25 while the valve 22 was held depressed, it would be impossible to siphon any amount of gasoline from the tank 10 because the side walls of the cylindrical member 15 would prevent the end of the conduit from reaching the gasoline level.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

1. As an article of manufacture with a gas or fuel tank having the usual gas receiving opening and cover receiving interrupted screw; a siphon and theftproof cover comprising a cylindrical member, a dome cap secured to said cylindrical member, a pair of dogs adapted to cooperate with the gas tank interrupted screw, a port through said dome cover, a depressible valve in said port, a valve stem supporting said valve, an apertured spider in said cylindrical member, said valve stem being telescopically guided in the bottom of the cylindrical member, a shoulder on said stem, a spring member between said shoulder and the bottom of said cylindrical member urging said valve to port closing position said spider guiding said stem above said shoulder.

2. As an article of manufacture with a gas or fuel tank having the usual gas receiving opening and cover receiving interrupted screw; a siphon and theftproof cover comprising a cylindrical member, a dome cap secured to said cylindrical member, a pair of dogs adapted to cooperate with the gas tank interrupted screw, a port through said dome cover, a depressible valve in said port, a valve stem being telescopically guided in the bottom of the cylindrical member, a shoulder on said stem, a spring member between said shoulder and the bottom of said cylindrical member urging said valve to port closing position, said cylindrical member being provided with a plurality of V-shaped slits in the side walls thereof.

3. As an article of manufacture with a gas or fuel tank having the usual gas receiving opening and cover receiving interrupted screw; a siphon and theftproof cover comprising a cylindrical member, a dome cap secured to said cylindrical member, a pair of dogs adapted to cooperate with the gas tank interrupted screw, a port through said dome cover, a depressible valve in said port, a valve stem supporting said valve, said valve stem being telescopically guided in the bottom of the cylindrical member, a shoulder on said stem, a spring member between said shoulder and the bottom of said cylindrical member urging said valve to port closing position, a protuberance on the top of said valve preventing said valve from accidentally locking the opening in a gas hose nozzle.

JOHN A. ROBERTS.